United States Patent [19]

Creps et al.

[11] Patent Number: 4,721,320
[45] Date of Patent: Jan. 26, 1988

[54] BICYCLE TRAILER HITCH

[75] Inventors: Bruce W. Creps; Donald A. George; Peter B. Berry; John E. Siekert; Robert C. Nyquist; Jeffrey B. Nyquist, all of Eugene, Oreg.

[73] Assignee: Burley Design Cooperative, Inc., Eugene, Oreg.

[21] Appl. No.: 42,793

[22] Filed: Apr. 27, 1987

[51] Int. Cl.⁴ .............................................. B62K 27/12
[52] U.S. Cl. ................................... 280/204; 280/292; 280/495; 280/504
[58] Field of Search ............... 280/204, 203, 292, 492, 280/495, 503, 504

[56] References Cited

U.S. PATENT DOCUMENTS 3,312,299  4/1967  Kuecker ........................ 280/204 X
3,347,559 10/1967  Robinson ........................... 280/204

FOREIGN PATENT DOCUMENTS 2532181  1/1977  Fed. Rep. of Germany ...... 280/203
186498 10/1922  United Kingdom ................ 280/203

Primary Examiner—John J. Love
Assistant Examiner—Mitchell J. Hill
Attorney, Agent, or Firm—John F. Ingman

[57] ABSTRACT

A bicycle trailer hitch which attaches to the bicycle between the chain stay and the seat stay at the crotch formed at the convergence of the two stays, the method of attachment being by three attaching members affixed to and extending inward from a main hitch member to which the bicycle trailer is connected. The three attaching members include a cone-plate member, wherein the intersection of a cone and a plate form a notch which engages the crotch between the two stays; a fixed finger located beneath the chain stay, and a movable finger located above the seat stay. Movement of the movable finger towards the seat stay is accomplished a pivoting member and a threaded tightening member, each attached pivotally at one end to the main hitch member, wherein the non-attached, threaded end of the tightening member passes through an aperture in the pivoting member so that rotation of a threaded knob engaged to the tightening member past the pivoting member will cause the knob to press against the pivoting member. This pressure rotates the pivoting member, pressing the movable finger against the seat stay. Continued tightening of the knob also will cause pressure by the fixed finger against the chain stay and movement of the cone-plate member into notch abutment against the crotch, this combination of pressures by the three attaching members against the bicycle frame locking the bicycle trailer hitch securely to the bicycle.

8 Claims, 7 Drawing Figures

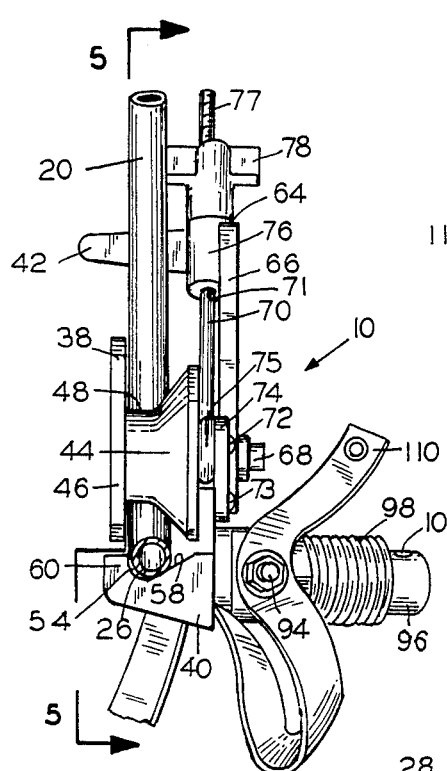
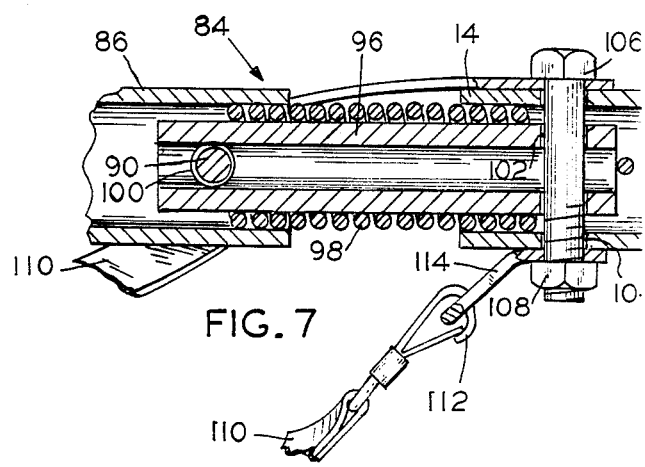
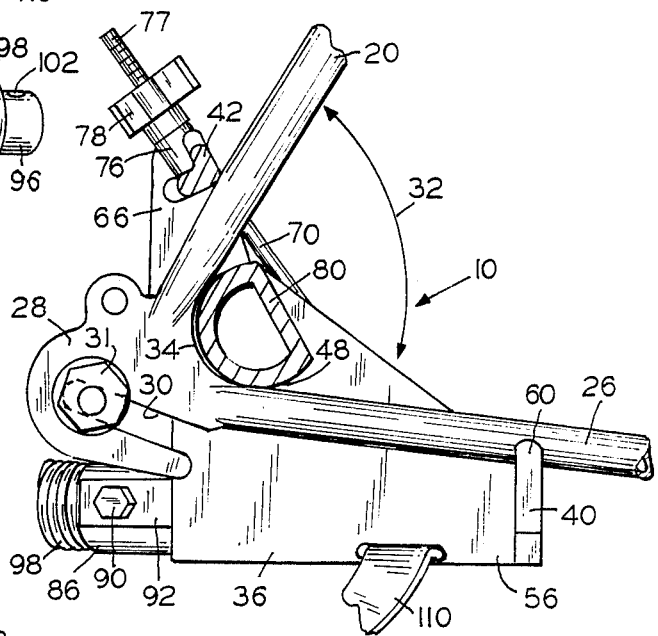
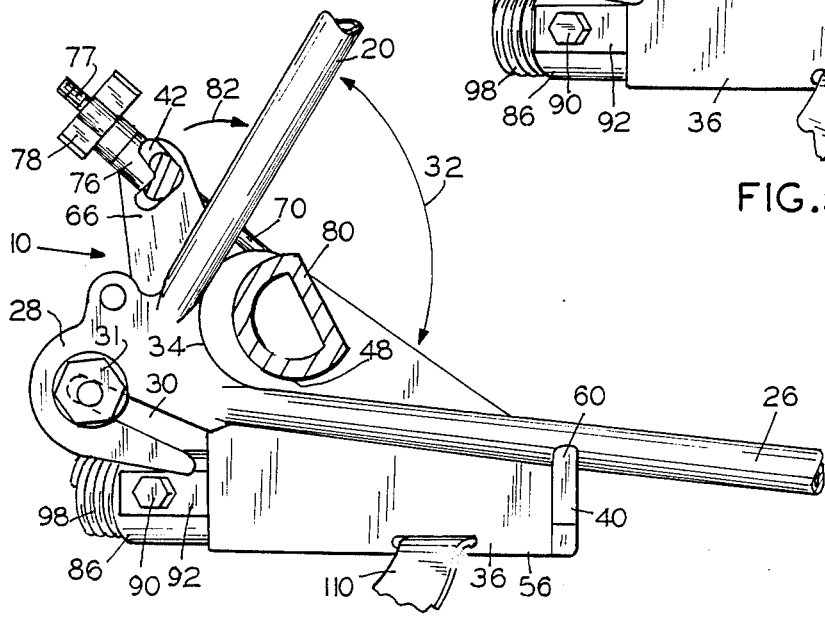

BICYCLE TRAILER HITCH

BACKGROUND OF THE INVENTION

1. Field of the Invention

The present invention generally relates to connections between bicycles and bicycle trailers, and more particularly, is concerned with a bicycle trailer hitch which attaches to the bicycle by a means of a three element engaging mechanism.

2. Description of the Prior Art

The use of trailers behind bicycles is increasing as cyclists find better ways of increasing the utility and capacity of their bicycles. Bicycle trailers have been developed both for around-town errands, such as carrying children, shopping, and hauling laundry and other loads. For bicycle tourists, trailers expand load capacity beyond conventional bags and panniers.

Methods of connecting bicycle trailers to bicycles are various. Some connections come off the bicycle seat, which provides attachment above the center of gravity of the bicycle, and thus adversely affects braking power. Some connections or hitches employ additional parts which attach at the rear axle of the bicycle and thus become a modification of the bicycle.

Other common bicycle trailer hitches attach to the rearmost bicycle frame members, normally referred to as stays, by means of bolted clamps which encircle the stays. The clamps themselves must withstand the stresses that the trailer connection provides; such stresses characteristically cause the clamps to slide along the stays and thus work themselves loose. Sliding clamps also mar the finish of the bicycle. Clamps are time consuming to attach and remove, normally requiring tools. Furthermore, different clamp configurations may be required, as various sizes of stays are used on different bicycles and may even be found on the same bicycle. Likewise, the angle between the stays will vary with different bicycle designs and sizes. In addition, on some bicycles, the stays are not coplanar, thus requiring a stay-clamping hitch to be twisted for installation.

In view of these shortcomings in current bicycle trailer hitches, there is a definite need for a bicycle trailer hitch which:

a. fits all bicycles, regardless of stay sizes and angles;
b. does not rely on clamps bolted to the stays;
c. does not require modification of the bicycle or additional parts for installation;
d. is easily installed and removed without tools;
e. may be transferred from bicycle to bicycle; and,
f. provides a safe, secure and convenient mechanism for attaching a bicycle trailer to a bicycle.

SUMMARY OF THE INVENTION

The present invention provides a bicycle trailer hitch which is designed to satisfy the aforementioned needs. In the preferred embodiment, the invention comprises a main hitch member, from which three positioning members extend, a cone-plate member which fits within the crotch formed between the seat stay and the chain stay portions of the bicycle frame, two finger-like projections, one fixed and the other movable, which are positioned on the outer side of the seat stay and chain stay respectively, and a means for physically repositioning the movable finger-like projection. Also attached to the main hitch member are connecting means to the bicycle trailer.

Accordingly, the bicycle trailer hitch provides a main hitch member, positioned on one side of the bicycle to the outside of the rearmost bicycle frame members, from which three members extend inwardly to contact and engage the bicycle frame proximate to the rear axle of the bicycle. The first such member extends inward from the rear portion of the main hitch member, the front and rear of the bicycle trailer hitch being consistent with the front and rear of the bicycle, and involves a cone-plate member where a narrowing cone abuts a plate so as to form a semi-circular, sloping notch for engagement in the crotch between the seat stay and the chain stay bicycle frame members.

A second inward extending member is located on the front portion of the main hitch member in the form of a fixed and rigid finger which, in use, is positioned beneath the chain stay so as to be outside of the angle formed between the seat stay and the chain stay. This fixed finger is formed at its end to partially encircle the chain stay and thus assists in holding the bicycle trailer hitch at the correct position relative to the chain stay.

The third extending member is in the form of a movable finger which, in use, lies above and outside of the seat stay. This movable finger extends inward toward the bicycle frame from the upper end of a pivoting member, which pivoting member extends upward from its pivot axis attachment near the rear of the main hitch member. In the preferred embodiment, a threaded tightening rod extends through an aperture in the upper end of the pivoting member, which tightening rod is pivotally attached to the main hitch member forward of the axis of rotation of the pivoting member. Rotation of a knob threaded upon the tightening rod will cause the knob to press against the upper end of the pivoting member, resulting in that upper end pivoting toward the seat stay. The movable finger located at the upper end of the pivoting member is thus pressed against the seat stay. Continued tightening continues to press the movable finger forceably against the seat stay, thus driving the notch of the cone-plate member into the crotch between the seat stay and the chain stay, so as lock the cone-plate member into that position. Continued tightening also draws the movable finger closer to the fixed finger, thus firmly grasping the seat stay and chain stay between the fingers, thereby precluding forward as well as vertical movement of the bicycle trailer hitch. When the knob is rotated until tight, the trailer bicycle hitch becomes firmly secured to the bicycle.

Removal merely requires the loosening of the knob threaded on the tightening rod sufficiently to disengage the cone-plate member and the fixed finger at the chain stay.

A connecting member is attached to the main hitch member to provide attachment to the tongue of the trailer. Such connecting member may consist of a flexible hose member, protected and supported externally by a segment of tightly coiled spring, wherein connection is made to both the main hitch member of the bicycle trailer hitch and the tongue of the trailer by a bolt member passing through holes formed in the ends of the flexible hose and through compatible holes in circular tubular connections of the main hitch member and the tongue of the bicycle trailer. A safety strap may be utilized to prevent separation of the bicycle trailer from the bicycle, should the main mode of interconnection fail.

BRIEF DESCRIPTION OF THE DRAWINGS

FIG. 4 illustrates a front elevation view of the bicycle trailer hitch, looking towards the rear of the bicycle.

FIG. 5 illustrates a sectional of the bicycle trailer hitch, as seen at 5—5 of FIG. 4, wherein the hitch is tightly mounted onto the bicycle frame.

FIG. 6 illustrates a sectional view, similar to that shown in FIG. 5, except that the hitch is loose on the bicycle before being tightened.

FIG. 7 illustrates a manner of connection of the trailer tongue to the bicycle trailer hitch.

DESCRIPTION OF THE PREFERRED EMBODIMENT

Figure 1:
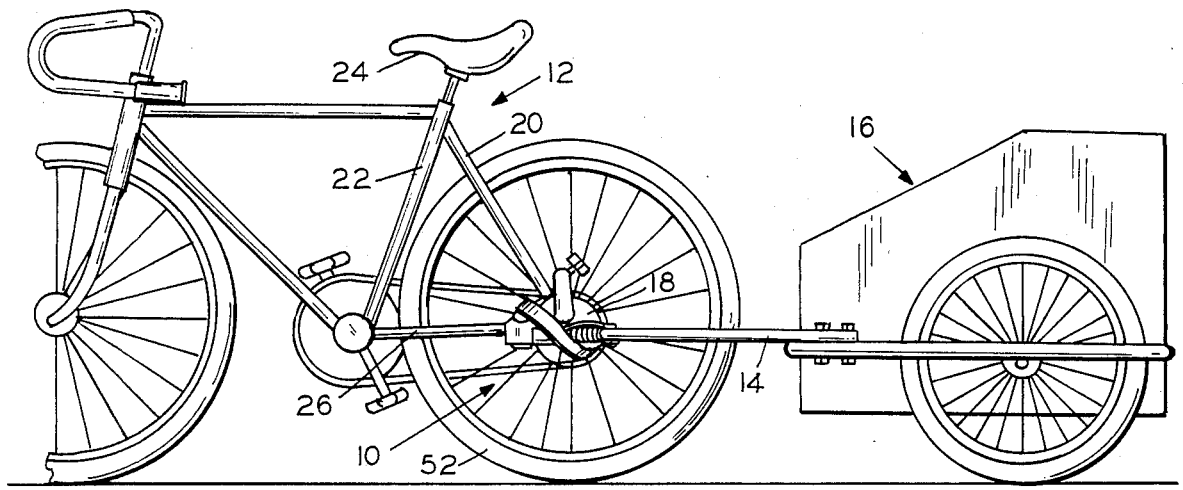
FIG. 1 illustrates a bicycle trailer connected to a bicycle utilizing the present invention.

Referring now to the drawings, and more particularly to FIG. 1, there is shown, in use, the bicycle trailer hitch 10 as it connects the bicycle 12 to the tongue 14 of a bicycle trailer 16. The preferred embodiment of the bicycle trailer hitch 10 is mounted on the left side of the bicycle 12 proximate to the rear axle 18. On each side of the bicycle 12, two frame members extend towards the rear axle 18 so as to locate and support it. One frame member, commonly termed the seat stay 20, joins the rear axle 18 to the main tube 22 at an upper location near the seat 24. A second frame member, commonly called the chain stay 26 joins the rear axle to the lower end of the main tube 20. The seat stay 20 and the chain stay 26 come together at a plate 28, called a drop out, which also provides a attachment slot 30 at which the rear axle 18 of the bicycle 12 is secured, normally by nuts 31. The seat stay 20 and the chain stay 26, where they come together at the plate 28 form a crotch 34, which is normally rounded in shape as is best seen in FIGS. 5 and 6.

Figure 2:
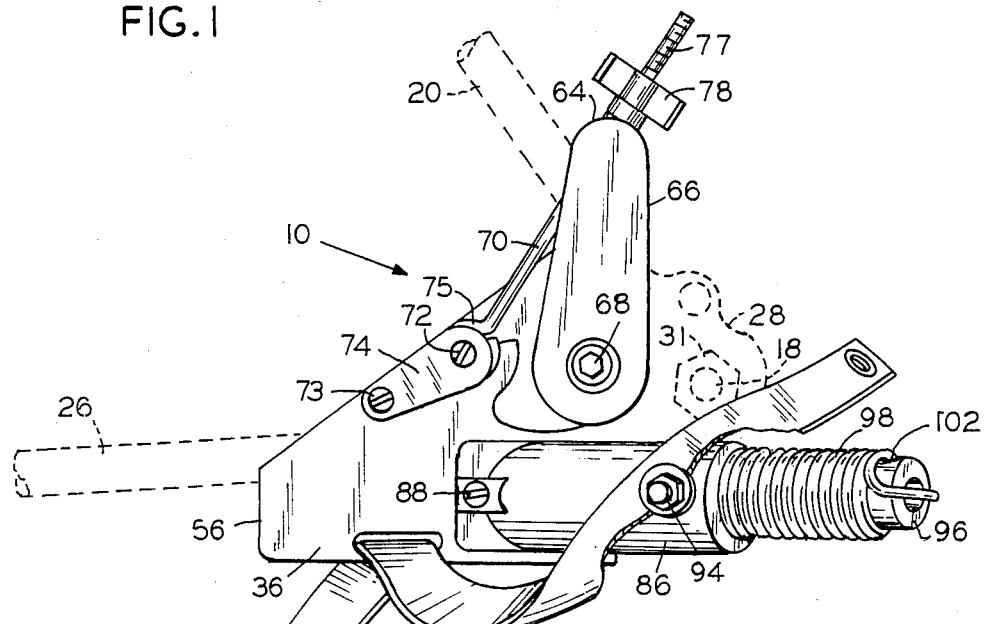
FIG. 2 illustrates a side elevation view of the bicycle trailer hitch as viewed from the outside of the bicycle, as in FIG. 1.
Figure 3:
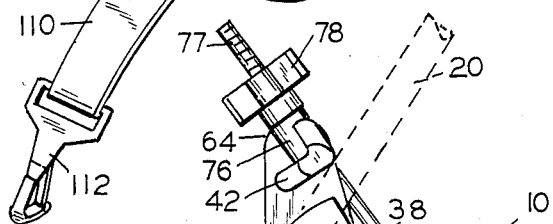
FIG. 3 illustrates a elevation view of the other side of the bicycle trailer hitch with trailer tongue and safety strap attached
Figure 3:
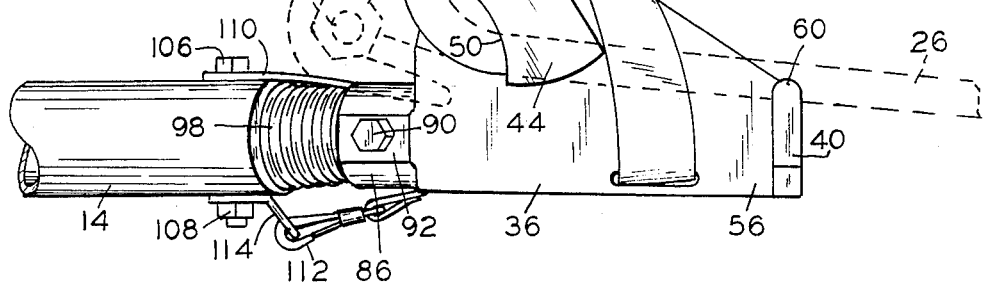

The bicycle trailer hitch 10 is better shown in FIGS. 2, 3 and 4. A main hitch member 36 of the bicycle trailer hitch 10 is generally located in use to the outside of the seat stay 20, chain stay 26, and the crotch 34. Attached to the main hitch member 36 and extending inward to contact the bicycle 12 are three (3) members: a cone-plate member 38 which fits in the crotch 34, a fixed finger 40 which extends beneath the chain stay 26, and a movable finger 42 which extends inward on top of the seat stay 20.

The cone-plate member 38, as best seen in FIG. 4, is comprised of a cone-shaped section 44 and an inner plate 46, wherein the cone-shaped section 44 is attached to, or formed with, the main hitch member 36 at the cone base or widest portion, and generally narrows as it extends from the main hitch member 36 to the inner plate 46, the plane of the inner plate 46 being normal to the axis of revolution of the conical shaped section 44. The abutment of the narrowing cone section 44 with the inner plate 46 forms a notch 48 in which the crotch 34 will be located in use, the slope of the cone-shaped section 44 serving to guide the crotch 34 into the notch 48. While the cone-shaped section 44 referred to above can be complete, it should be noted that the angle 32 (see FIGS. 5 and 6) between the seat stay 20 and the chain stay 26, and therefore the extent of the crotch 34, is less than ninety degrees, and that only that portion of the cone-shaped section 44 that could possibly contact the the crotch 34 or the stays 20 and 26 is necessary. Therefore, in the preferred configuration illustrated, the cone-shaped section 44 is flattened opposite the the portion which contacts the crotch 34, as is best seen in FIGS. 5 and 6. The inner plate 46 is formed with a concave section 50, so as to avoid possible contact with portions of the rear axle 18, rear wheel 52, or fenders or racks or their attaching hardware. With the crotch 34 located in the notch 48, the inner plate 46 also provides restraint against outward movement of the main hitch member 36 through abutment on the inside of the seat stay 20 and the chain stay 26. When the notch 48 is located in the crotch 34 under pressure from forward of the cone-plate member 38, the cone-plate member 38 denies movement of the main hitch body 36.

The second extending member, a fixed finger 40, extends, in the preferred embodiment, inward from the forward end 56 of the main hitch member 36, so that it lies beneath the chain stay 26. The fixed finger 40, so called because of its rigid attachment to the main hitch member 36, is designed in the preferred embodiment so that a downward sloping surface 58 terminates in an upward extending projection 60, the intersection of this projection 60 with the downward sloping surface 58 forming a notch 54 which presents a preferred location for the chain stay 26 of the bicycle 12, as is best seen at FIG. 4. When pressed tightly against the chain stay 26, the fixed finger 40 precludes upward movement of the forward end 56 of the main hitch member 36, and by notch 54 prevents inward and outward horizontal movement relative to the chain stay 20, thereby keeping the main hitch member 36 aligned between the stays 20 and 26.

The third extending element is a movable finger 42, so called because it is capable of movement relative to the main hitch member 36 of the bicycle trailer hitch 10. The movable finger 42 is a projection which extends inwardly, so as to lie above, and to the outside, of the seat stay 20. The movable finger 42 extends inwardly from the outer end 64 of a pivoting member 66, which pivoting member 66 is pivotally attached to the main hitch member 36 by means of a bolt 68, which permits rotation forwards and backwards in the general plane of the main hitch member 36. A threaded tightening member 70 also is pivotally attached to the main body element 36 so that it also rotates forward and backward in the same general plane as the pivoting member 66. In the preferred embodiment a threaded eyebolt has been found to work well as the tightening member 70, the attachment being provided by a screw 72 extending through an attachment plate 74 and the eye 75, which attachment plate 74 also is secured to the main hitch member 36 by screw 73. The threaded end 77 of the tightening member 70 passes through an aperture 71 in knob-abutting member 76 formed at the outer end 64 of the pivoting member 66, and a threaded knob 78 is engaged on the threaded end 77 of tightening member 70.

When the threaded knob 78 is rotated clockwise, its movement will cause it to press against the knob-abutting member 76 of the pivoting member 66, forcing the pivoting member 66 towards the seat stay 20. It is by such movement of the pivoting member 66 that the bicycle trailer hitch 10 is locked to the bicycle 12.

By referring now to FIGS. 5 and 6, one can better appreciate the mechanism by which the bicycle trailer hitch 10 is mounted. FIG. 6 shows the bicycle trailer hitch 10 loosely mounted, wherein the cross section 80 of the notch 48 of the cone-plate member 38 is located in the vicinity of the crotch 34 between the seat stay 20 and the chain stay 26, the fixed finger 40 is resting beneath and against the chain stay 26, and the movable finger 42 is a distance from the seat stay 20, where it is loosely adjacent to the threaded knob 78 mounted on the tightening member 70. When the threaded knob 78 is rotated down the tightening member 70, as noted previously, the pivoting member 66 will rotate forward, as shown at 82, so as to press against the seat stay 20. Continued tightening and the resultant pressure against the seat stay 20 will force the main hitch member 36, including the cone-plate member 38, into the crotch 34 of the bicycle frame, as seen in FIG. 5, with the fingers 40 and 42 applying pressure from the outside of the chain stay 26 and the seat stay 20, respectively. Simple tightening of the threaded knob 78 thus locks the bicycle trailer hitch 10 into position where it is securely held held by the three extending members 38, 40, and 42 as previously described.

As seen in FIGS. 1–6, a trailer connecting means 84 is attached to the main hitch member 36 to provide connection to the tongue 14 of the bicycle trailer 16. The connecting means 84, in the preferred embodiment, includes a connector housing 86 which is attached to the main hitch member 36 by means of screw 88 and bolt 90, the latter passing through a tab 92 extending from the main hitch member 36 and through the connector housing 86, and being secured by a nut 94. A flexible connection is provided by a piece of flexible hose 96 which is supported and protected by an encircling coil spring 98. An aperture 100 is formed near the connector housing end of the flexible hose 96 so that bolt 90 passes through that aperture 100 and thus secures the flexible hose 96 to the connector housing 86. Similiarly, an aperture 102 is formed near the other end of the flexible hose 96, so that the tubular trailer tongue 14, having an aperture 104 formed therein, may be joined to the flexible hose 96 by means of a threaded bolt 106 and nut 108, as is shown in FIG. 7. A safety strap 110 is employed in the preferred embodiment, the safety strap 110 being attached to the connector housing 86 under nut 94, with one end of the strap 110 being fastened under the head of bolt 106 while the other end wraps around the main hitch member 36 and the chain stay 26 (see FIG. 3) to return to bolt 106 where it is connected by a snap-clip 112 to a D-ring 114 fastened beneath nut 108.

While the above described preferred embodiment has the fixed finger 40 located adjacent to and outside the chain stay 26, and the movable finger 42, with its associated pivoting member 66 and movement means, located adjacent to and outside of the seat stay 20, this arrangement would be readily reversable, with no significant effect on the invention other than a slightly reduced road and pedal clearance for the bicycle trailer hitch 10. Such a configuration, with the fixed finger adjacent to the seat stay and the movable finger beneath the chain stay is specifically included within the scope of this invention. Similarly, it is clear that, while in this preferred embodiment the bicycle trailer hitch 10 is attached to the left side of the bicycle, it could easily be configured to be applied to the right side of the vehicle, and may be, in some instances, preferred on that side.

It is thought that the bicycle trailer hitch of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

We claim:

1. A bicycle trailer hitch for connecting a bicycle trailer to a bicycle, wherein the bicycle trailer has a trailer tongue, and the bicycle has on each side, for support of a rear axle and wheel, a first frame member and a second frame member which converge at an angle adjacently ahead of the rear axle, the convergence forming a crotch between said two frame members; the bicycle trailer hitch comprising:
   a. a main hitch member, having a front, a rear, an outer side positioned away from the bicycle, and an inner side positioned toward the bicycle;
   b. a crotch engaging member, attached to the rear inner side of the main hitch member and extending inwards towards the bicycle so as to be positioned within the crotch between the first frame member and the second frame members, whereat it engages said crotch;
   c. a fixed positioning member located on the inner side of the main hitch member forward of the crotch engaging member, and extending inwards towards the bicycle so as to be located adjacent to the first frame member outside of the angle formed by the first and second frame members;
   d. a movable positioning member, attached to the main hitch member and extending inwards toward the bicycle so as also to be located adjacent to the second frame member outside of the angle formed by the first and second frame members;
   e. means for causing movement of said movable positioning member toward the inside of the angle formed by the first and second frame members;
   f. wherein said movement of the movable positioning member, the movable positioning member being located outside of the second frame member, will cause the movable positioning member to press against the outside of the second frame member, will cause the fixed positioning member to press against the outside of the first frame member and in addition will cause the crotch engaging member to press against the crotch between the two frame members, which combination of pressures serve to securely lock the main hitch member against the crotch between the two frame members, and thereby attach the bicycle trailer hitch to the bicycle; and
   g. means for connecting the trailer tongue to the main hitch member.

2. The bicycle trailer hitch, as recited in claim 1, wherein the crotch engaging member is comprised of;
   a. a cone-like surface having its base at the main hitch member and extending therefrom with a decreased diameter;
   b. a plate formed across the decreased diameter of the cone-like surface;
   c. the intersection of the cone-like surface and the plate forming a notch for abutment of the crotch engaging member against said crotch, the cone-like surface providing guided positioning of the crotch engaging member into the crotch and the notch providing restraint against rearward, lateral and vertical movement.

3. The bicycle trailer hitch, as recited in claim 1, wherein the fixed positioning member is a finger-like projection extending transversely from the main hitch member forward of the crotch engaging member, so as to be located adjacent to the first frame member but outside of the angle formed by the convergence of the first frame member and the second frame member.

4. The bicycle trailer hitch, as recited in claim 3, wherein the finger-like projection of the fixed positioning member, at its outer end, additionally includes an angled extension so as to form a notch for positioning against the first frame member.

5. The bicycle trailer hitch, as recited in claim 1, wherein the movable positioning member comprises:
   a. a pivoting member, having an inner end which is rotatably attached to the main hitch member, and an outer end; and
   b. a finger-like projection extending transversely from the outer end of the pivoting member, so as to be located adjacent to the second frame member but outside of the angle formed by the convergence of the first frame member and the second frame member.

6. The bicycle trailer hitch, as recited in claim 5, wherein the means for causing movement for the movable positioning member comprise:
   a. a threaded tightening member, having an inner end and a threaded outer end, the inner end being rotatably attached to the main hitch member, and the threaded outer end extending through an aperture in the outer end of the pivoting member; and
   b. a knob, having a threaded aperture extending therethrough so as to engage the threaded tightening member, wherein rotation of the knob will cause the knob to move up and down the threaded tightening member, and wherein movement down the threaded tightening member toward its inner end will cause pressure contact by the knob with the outer end of the pivoting member, thereby urging rotation of the finger-like projection extending from the outer end of the pivoting member toward the inside of the angle formed by the first and second frame members.

7. A bicycle trailer hitch for connecting a bicycle trailer to a bicycle, wherein the bicycle trailer has a trailer tongue, and the bicycle has on each side, for support of a rear axle and wheel, a first frame member and a second frame member which converge at an angle adjacently ahead of the rear axle, the convergence forming a crotch between said two frame members; the bicycle trailer hitch comprising:
   a. a main hitch member, having a front, a rear, an outer side positioned away from the bicycle, and an inner side positioned toward the bicycle;
   b. a crotch engaging member, attached to the rear inner side of the main hitch member and extending inwards towards the bicycle so as to be positioned within the crotch between the first frame member and the second frame members, whereat it engages said crotch, said crotch engaging member including:
      (1) a cone-like surface having its base at the main hitch member and extending therefrom with a decreased diameter;
      (2) a plate formed across the decreased diameter of the cone-like surface;
      (3) the intersection of the cone-like surface and the plate forming a notch for abutment of the crotch engaging member against said crotch;
   c. a fixed positioning member comprising a finger-like projection extending transversely from the main hitch member forward of the crotch engaging member, so as to be located adjacent to the first frame member but outside of the angle formed by the convergence of the first frame member and the second frame member, the finger-like projection of the fixed positioning member additionally including at its outer end an angled extension so as to form a notch for positioning against the first frame member;
   d. a movable positioning member and the means for causing its movement, which comprise:
      (1) a pivoting member, having an inner end which is rotatably attached to the main hitch member, and an outer end;
      (2) a finger-like projection extending transversely from the outer end of the pivoting member, so as to be located adjacent to the second frame member but outside of the angle formed by the convergence of the first frame member and the second frame member;
      (3) a threaded tightening member, having an inner end and a threaded outer end, the inner end being rotatably attached to the main hitch member, and the threaded outer end extending through an aperture in the outer end of the pivoting member;
      (4) a knob, having a threaded aperture extending therethrough so as to engage the threaded tightening member, wherein rotation of the knob will cause the knob to move up and down the threaded tightening member, and wherein movement down the threaded tightening member toward its inner end will cause pressure contact by the knob with the outer end of the pivoting member, thereby urging rotation of the fingoerlike projection extending from the outer end of the pivoting member toward the inside of the angle formed by the first and second frame members;
   e. wherein said movement of the movable positioning member, the finger-like projection being located outside of the second frame member, will cause the finger-like projection to press against the outside of the second frame member, will cause the fixed positioning member to press against the outside of the first frame member and in addition will cause the crotch engaging member to press against the crotch between the two frame members, which combination of pressures serve to securely lock the main hitch member against the crotch between the two frame members; and
   f. means for connecting the trailer tongue to the main hitch member.

8. A bicycle trailer hitch for connecting a bicycle trailer to a bicycle, wherein the bicycle trailer has a trailer tongue, and the bicycle has on each side, for support of a rear axle and wheel, a chain stay and a seat stay which converge adjacently ahead of the rear axle, the convergence forming a crotch between the chain stay and the seat stay; the bicycle trailer hitch comprising:

a. a main hitch member, having a front, a rear, an outer side positioned away from the bicycle, and an inner side positioned toward the bicycle;
b. a crotch engaging member, attached to the rear inner side of the main hitch member and extending inwards towards the bicycle so as to be positioned within the crotch between the chain stay and the seat stay, whereat it engages the crotch;
  (1) a cone-like surface having its base at the main hitch member and extending therefrom with a decreased diameter:
  (2) a plate formed across the decreased diameter of the cone-like surface;
  (3) the intersection of the cone-like surface and the plate forming a notch for abutment of the crotch engaging member against said crotch;
c. a fixed positioning member comprising a finger-like projection extending transversely from the main hitch member forward of the crotch engaging member, so as to be located adjacent to the chain stay but outside of the angle formed by the convergence of the chain stay and the seat stay, and beneath the chain stay; the finger-like projection of the fixed positioning member additionally including at its outer end an angled extension to provide a notch for positioning against the chain stay;
d. a movable positioning member and the means for causing its rotation, which comprise:
  (1) a pivoting member, having an inner end which rotates at its attachment to the main hitch member, and an outer end;
  (2) a finger-like projection extending transversely from the outer end of the pivoting member, so as to be located adjacent to the seat stay but outside and above the angle formed by the convergence of the chain stay and the seat stay;
  (3) a threaded tightening member, having an inner end and a threaded outer end, the inner end being rotatably attached to the main hitch member, and the threaded outer end extending through an aperture in the outer end of the pivoting member;
  (4) a knob, having a threaded aperture extending therethrough so as to engage the threaded tightening member, wherein rotation of the knob will cause the knob to move up and down the threaded tightening member, and wherein movement down the threaded tightening member toward its inner end will cause pressure contact by the knob with the outer end of the pivoting member, thereby urging rotation of the finger-like projection extending from the outer end of the pivoting member toward the inside of the angle formed by the chain stay and the seat stay;
e. wherein said movement of the movable positioning member, its finger-like projection being located outside of the seat stay and pressing against the seat stay, will cause the finger-like projection to press against the seat stay; will cause the fixed positioning member to press against the outside of the chain stay; and in addition will cause the crotch engaging member to press against the crotch between the two stays; which pressures, when combined, serve to securely lock the bicycle trailer hitch against the crotch between the two stays; and
f. means for connecting the trailer tongue to the main hitch member.

* * * * *